United States Patent
de Andrada et al.

(10) Patent No.: US 9,692,603 B2
(45) Date of Patent: Jun. 27, 2017

(54) BIOMETRIC PKI AUTHENTICATION

(71) Applicant: Verizon Patent and Licensing Inc., Arlington, VA (US)

(72) Inventors: Mauricio Pati Caldeira de Andrada, South Plainfield, NJ (US); Manuel Enrique Caceres, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 80 days.

(21) Appl. No.: 14/739,535

(22) Filed: Jun. 15, 2015

(65) Prior Publication Data
US 2016/0337131 A1 Nov. 17, 2016

Related U.S. Application Data

(60) Provisional application No. 62/162,109, filed on May 15, 2015.

(51) Int. Cl.
*H04L 9/32* (2006.01)
*H04L 29/06* (2006.01)
*H04L 9/14* (2006.01)
*H04W 12/06* (2009.01)
*H04L 9/08* (2006.01)

(52) U.S. Cl.
CPC .......... *H04L 9/3263* (2013.01); *H04L 9/0866* (2013.01); *H04L 9/0894* (2013.01); *H04L 9/14* (2013.01); *H04L 63/0823* (2013.01); *H04L 63/0861* (2013.01); *H04W 12/06* (2013.01); *H04L 2209/24* (2013.01); *H04L 2209/64* (2013.01)

(58) Field of Classification Search
CPC ....... H04L 9/14; H04L 9/0825; H04L 9/3263; G06F 21/32
USPC ................. 713/176, 175, 186; 726/6, 16, 5; 455/404.1; 370/329
See application file for complete search history.

(56) References Cited

U.S. PATENT DOCUMENTS

| | | | |
|---|---|---|---|
| 8,494,485 B1* | 7/2013 | Broch | H04L 9/3263 370/329 |
| 8,503,376 B2* | 8/2013 | Cha | H04L 63/0428 370/329 |
| 8,582,762 B2* | 11/2013 | Holtmanns | H04L 63/06 380/44 |
| 8,646,060 B1* | 2/2014 | Ben Ayed | H04L 63/0853 726/9 |
| 9,264,902 B1* | 2/2016 | Ward | H04L 63/0442 |
| 9,331,990 B2* | 5/2016 | Le Saint | G06Q 20/38215 |
| 9,350,548 B2* | 5/2016 | Bagley | H04L 9/3242 |

(Continued)

*Primary Examiner* — Dede Zecher
*Assistant Examiner* — Viral Lakhia

(57) ABSTRACT

A mobile device obtains an encryption key pair, including a public key and a private key, and engages in a process, that uses the private key, for requesting a digital certificate from a Public Key Infrastructure (PKI) Certificate Authority. The mobile device receives a digital certificate signed by the PKI Certificate Authority, and obtains, via a biometric input unit device, biometric data related to an identity of a user of the device. The mobile device derives a password using the biometric data, and stores, and password protects using the derived password, the public key, the private key, and the digital certificate in a secure key store.

20 Claims, 10 Drawing Sheets

(56) References Cited

U.S. PATENT DOCUMENTS

| | | | | |
|---|---|---|---|---|
| 2010/0136943 A1* | 6/2010 | Hirvela | ............... | H04W 4/00 |
| | | | | 455/404.1 |
| 2010/0150353 A1* | 6/2010 | Bauchot | ............... | G06F 21/32 |
| | | | | 380/282 |
| 2011/0131406 A1* | 6/2011 | Jones | ............... | H04L 65/1053 |
| | | | | 713/150 |
| 2013/0237190 A1* | 9/2013 | Smith | ............... | H04L 63/0492 |
| | | | | 455/411 |
| 2013/0263211 A1* | 10/2013 | Neuman | ............... | H04L 63/08 |
| | | | | 726/1 |
| 2013/0290717 A1* | 10/2013 | Hart | ............... | G06F 21/602 |
| | | | | 713/168 |
| 2014/0013109 A1* | 1/2014 | Yin | ............... | H04L 63/0823 |
| | | | | 713/155 |
| 2015/0095999 A1* | 4/2015 | Toth | ............... | H04L 63/08 |
| | | | | 726/6 |
| 2015/0121506 A1* | 4/2015 | Cavanaugh | ............... | G06F 21/6218 |
| | | | | 726/16 |
| 2015/0237031 A1* | 8/2015 | Neuman | ............... | H04L 63/08 |
| | | | | 713/176 |
| 2015/0249540 A1* | 9/2015 | Khalil | ............... | H04L 63/0853 |
| | | | | 713/158 |
| 2015/0278495 A1* | 10/2015 | Yu | ............... | G06F 21/32 |
| | | | | 713/186 |
| 2016/0057121 A1* | 2/2016 | Metsala | ............... | H04L 63/0823 |
| | | | | 713/175 |

* cited by examiner

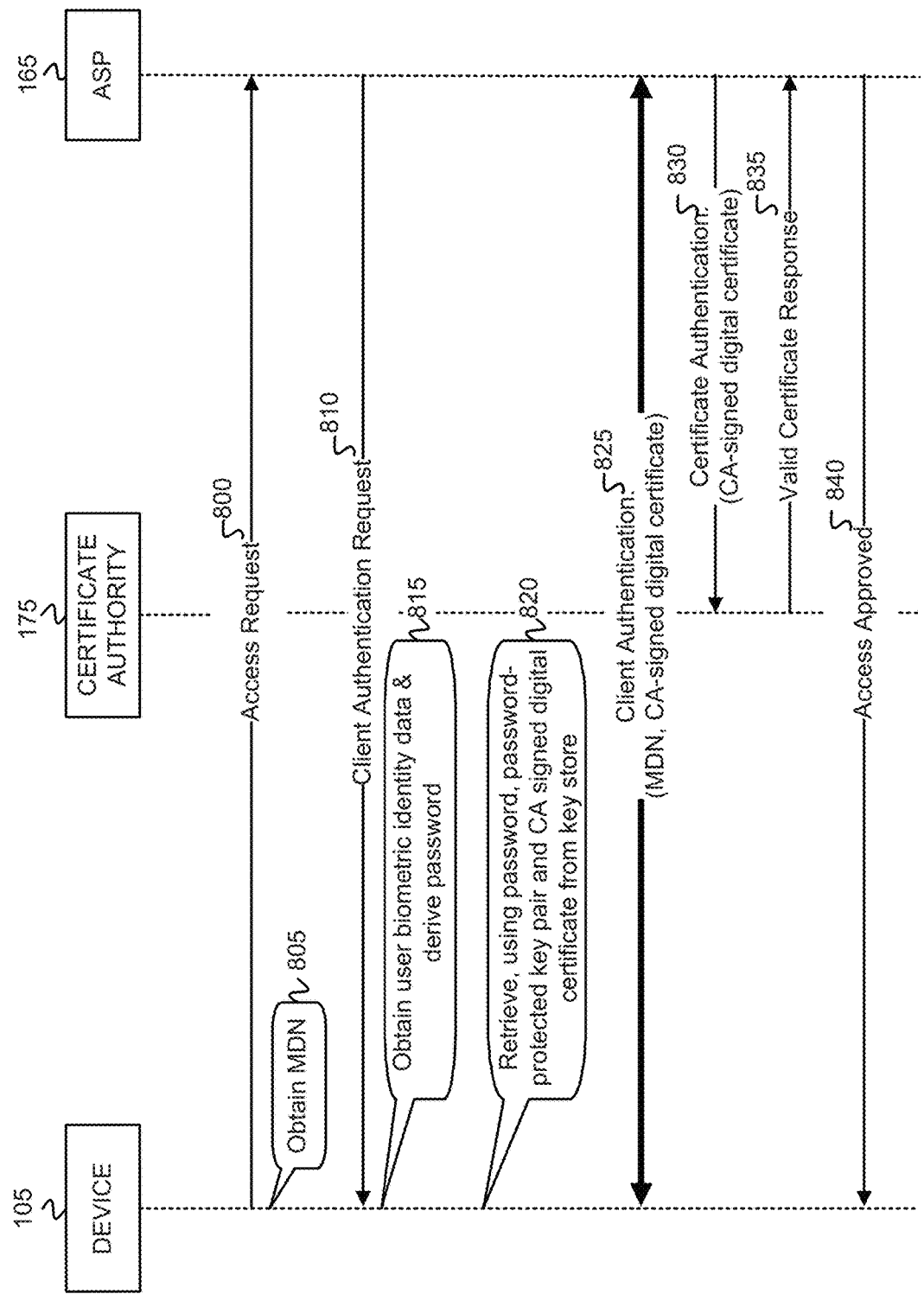

BIOMETRIC PKI AUTHENTICATION

CROSS-REFERENCE TO RELATED APPLICATION

This application claims priority under 35 U.S.C. §119, based on U.S. Provisional Application No. 62/162,109, filed May 15, 2015, the disclosure of which is hereby incorporated by reference herein.

BACKGROUND

Various network services require users to create an account to be granted access to the network services. Creating an account typically involves the user creating credentials, such as an alphanumeric log-in/password combination, that permit the user access to a given network service. The use of an alphanumeric log-in/password combination for network service account access can be vulnerable to attack for a few different reasons, such as, for example, password re-use, weak passwords, vulnerable password databases, and credentials being exchanged in the clear. With password re-use, a user reuses a same password or a same log-in/password combination for multiple different accounts thereby increasing the chances that the password or log-in/password combination will be comprised. With weak passwords, the user selects a password that is too easy to be guessed. For example, a password "password" selected by a user because it is easy to remember, can lead to the user's account being compromised. Vulnerable password databases can be accessed in an unauthorized fashion, and a user's password or log-in/password combination retrieved such that the user's account is compromised. Credentials being exchanged in the clear can lead to various efforts to "eavesdrop" on the credential exchange, leading to the compromise of the user's account.

BRIEF DESCRIPTION OF THE DRAWINGS

FIG. 8 is a messaging diagram associated with the exemplary process of FIG. 7.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1A:
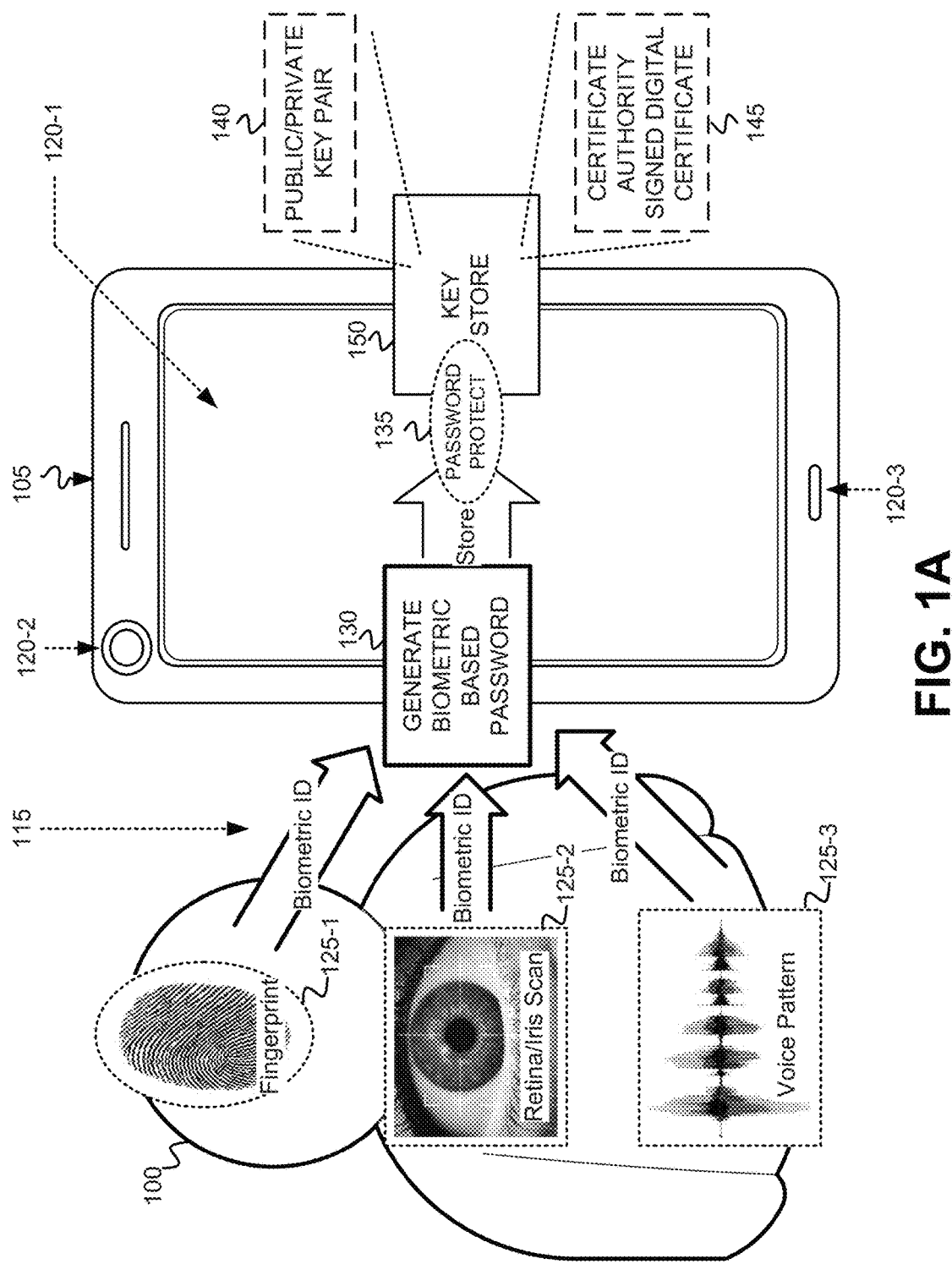
FIGS. 1A and 1B are diagrams that depict an overview of using a mobile device to generate, store and protect user credentials for use in authenticating the user when the user establishes a user account and/or logs into a user account.
Figure 1B:
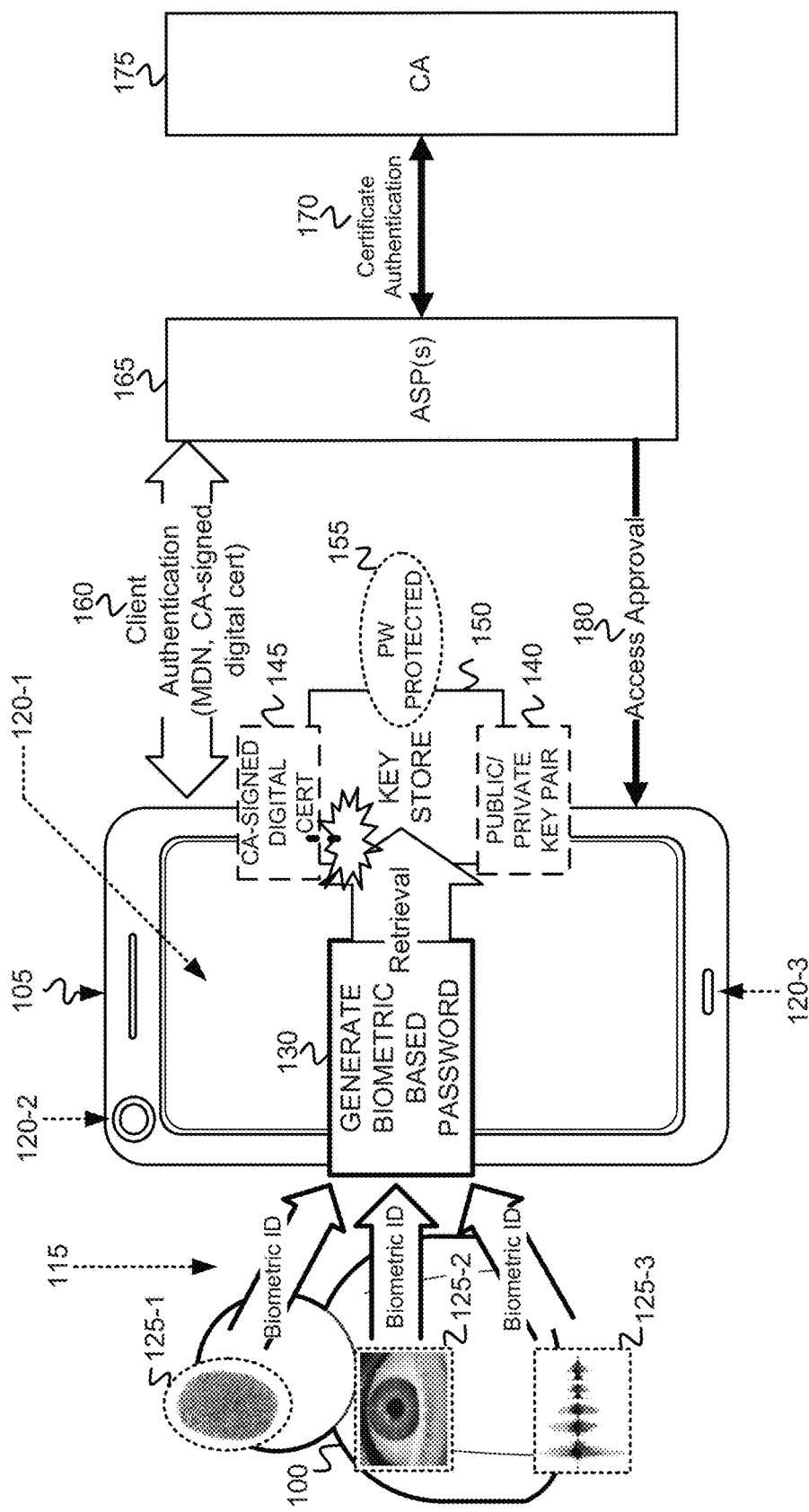

FIGS. 1A and 1B are diagrams that depict an overview of using a mobile device to generate, store and protect user credentials for use in authenticating the user for purposes of establishing a user account and/or for logging into a user account. As shown in FIG. 1A, a user 100, using one or more biometric input devices of a mobile device 105, provides biometric data 115 associated with an identification of user 100. For example, the one or more biometric input devices may include a touch panel 120-1 that scans a finger pad of user 100 to obtain fingerprint biometric data 125-1, a camera 120-2 configured to scan (i.e., take a picture of) an iris or retina of an eye of the user to obtain eye biometric data 125-2, and/or a microphone 120-3 and associated recording circuitry configured to record a word or phrase spoken by the user of the device to obtain voice pattern biometric data 125-3.

Mobile device 105 generates 130 a biometric-based password by applying an algorithm to the obtained biometric data 115. The algorithm may include, for example, a hashing algorithm. Other types of password generating algorithms may be used. Mobile device 105 may then delete the biometric data 125 and use the generated biometric-based password to store, and password protect 135, a previously obtained public/private key pair 140 and a previously received certificate authority-signed digital certificate 145 in a key store 150 in a memory within mobile device 105. In one implementation, the public/private key pair 140 may have been generated by mobile device 105 using an asymmetric encryption key generation algorithm. In a further implementation, the certificate authority-signed digital certificate 145 may be received from a Public Key Infrastructure (PKI) certificate authority (CA) as a result of a process for requesting the digital certificate from the PKI Certificate Authority.

FIG. 1B further depicts the retrieval of the certificate authority-signed digital certificate 145 and/or public/private key pair 140 from key store 150 based on a user biometric-based password. As shown in FIG. 1B, user 100, using the one or more biometric input devices of mobile device 105, again provides biometric data 115 associated with an identification of user 100. The one or more biometric input devices may include touch panel 120-1, camera 120-2 and/or microphone 120-3 (and associated recording circuitry). The biometric data 115 obtained from the one or more biometric input devices may include the same biometric identification data described with respect to FIG. 1A using the same one or more biometric input devices. Mobile device 105 generates 130 the biometric-based password by applying the same algorithm (described above) to the obtained biometric data 115 previously used to generate the biometric-based password and to password protect the digital certificate 145 and key pair 140 stored in key store 150. Mobile device 105 uses the newly generated biometric password 130 to retrieve the password protected 155 digital certificate 145 and key pair 140 from key store 150 in a memory of mobile device 105.

Mobile device 105, subsequent to retrieval of digital certificate 145, engages in client authentication 160 with an Application Service Provider (ASP) 165 (also referred to generally as an "application server"). The client authentication 160 may include a client authentication request that further includes mobile device 105's Mobile Directory Number (MDN), and the retrieved certificate authority-signed digital certificate 145. Upon receipt of the client authentication request, ASP 165 engages in certificate authentication 170 with a Certificate Authority (CA) 175, which includes sending digital certificate 145 to CA 175 and, in turn, includes CA 175 authenticating digital certificate 145, and returning a response that indicates that digital certificate 145 is valid or invalid. Upon receipt of a response from CA 175 indicating that digital certificate 145 has been authenticated as valid, then ASP 165 returns an access approval message 180 to mobile device 105 that enables user 100 of mobile device to create a user account with ASP 165 and/or log-in to an existing user account previously created at ASP 165.

Figure 2:
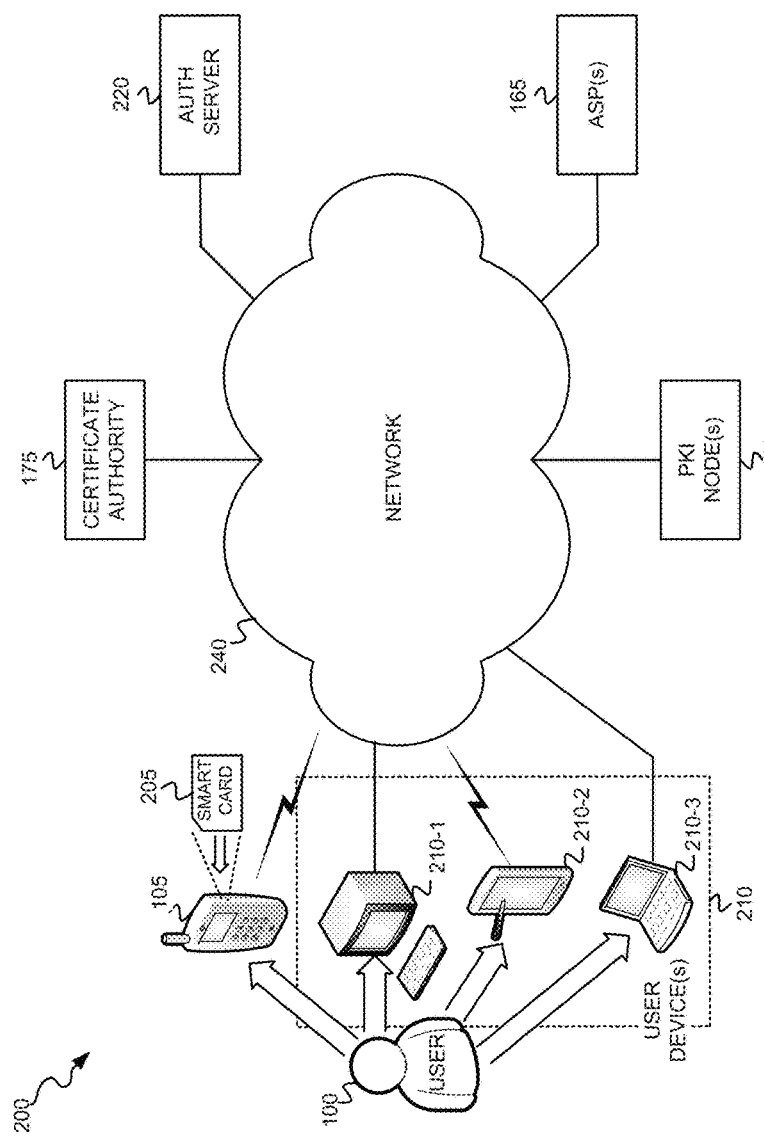
FIG. 2 is a diagram that depicts an exemplary network environment in which user credentials are generated and stored at a mobile device, using biometric based password protection, and then retrieved for use in authenticating the user.

FIG. 2 is a diagram that depicts an exemplary network environment 200 in which user credentials are generated and stored at a mobile device, using biometric based password protection, and then retrieved for use in authenticating the user for creating a user account and/or logging into an existing using account. Network environment 200 includes mobile device 105, that may have a smart card 205 inserted, one or more user devices 210 (user devices 210-1, 210-2 and 210-3 shown by way of example), Public Key Infrastructure (PKI) Certificate Authority 175, authentication server 220, application service provider(s) (ASP(s)) 165, other PKI nodes 230, and network 240.

Mobile device 105 may an electronic device that may include an interface for inserting smart card 205, and which further includes a wireless interface for communicating via network 240. Mobile device 105 may include, for example, a cellular radiotelephone, a smart phone, a personal digital assistant (PDA), a palmtop or tablet computer, or a media player. Mobile device 105 may include any type of electronic device that may include one or more biometric input devices and a memory for storing a key store.

Smart card 205 may include any type of smart card capable of being inserted in mobile device 105 and that stores and processes data relevant to the operation of mobile device 105. Smart card 120 may, for example, include a small microprocessor card embedded with memory storage components and microprocessor components. Smart card 205 may include a Subscriber Identity Module (SIM), a Universal Integrated Circuit Card (UICC), or a Removable User Identify (R-UIM) card. SIM cards securely store an identifier (e.g., MDN) and/or key used to identify a subscriber on mobile telephone devices (e.g., cellular radiotelephones). SIM cards enable users to change phones by removing the SIM card from one telephony device and inserting it into another telephony device. UICCs are smart cards used in mobile devices in Global System for Mobile Communications (GSM) networks, Universal Mobile Telecommunications System (UMTS) networks (e.g., Universal Subscriber Identity Modules (USIMs)), and IP Multimedia Subsystem (IMS) networks (e.g., Internet Protocol Multimedia Services Identity Modules (ISIMs)). UICCs ensure the integrity and security of different types of personal data, and may include several applications that permit access to both GSM and UMTS networks. R-UIMs include cards having features that are usable with Code Division Multiple Access (CDMA), GSM and UMTS devices. Other types of smart cards, not described herein, may be used for smart card 205.

User device(s) 210 may include at least one device, used by user 100 in addition to mobile device 105, for connecting to network 240 via wired or wireless mechanisms. User device(s) 210 may include, for example, a desktop computer 210-1, a tablet computer 210-2 and/or a laptop computer 210-3. User device(s) 210 may additionally, or alternatively, include a palmtop computer, a gaming device, a media player device, or a digital camera that includes communication capabilities (e.g., wireless communication mechanisms).

Certificate authority 175 includes one or more network devices that act as a node in a Public Key Infrastructure system (PKI) for generating and issuing a digital identity certificate requested by a user 100. Authentication server 220 includes one or more network devices that verify the identity of user 100 and that issue Authentication and Key Agreement (AKA) challenges to a user 100 of a mobile device 105. ASP(s) 165 includes one or more network devices that host web pages of a website(s) that may be accessed by user 100 via mobile device 105, or via device(s) 210. User 100 may establish an account with ASP(s) 165, using the processes described herein for user authentication, which may permit user 100 to log into the account, possibly using the processes described herein for user authentication, for accessing network services, content, or other data at ASP(s) 165.

PKI node(s) 230 includes one or more other nodes of the PKI system that, in conjunction with certificate authority 175, bind user public keys with respective user identities and assist in the creation, management, distribution, storage and revocation of digital identity certificates. PKI node(s) 230 may include, for example, a registration authority (RA) that verifies the identity of users requesting information from the certificate authority.

Network 240 includes one or more networks of any type, such as, for example, a telecommunications network (e.g., a Public Switched Telephone Network (PSTN) or Public Land Mobile Network (PLMN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

The configuration of the components of network environment 200 depicted in FIG. 2 is for illustrative purposes only. It should be understood that other configurations may be implemented. Therefore, network environment 200 may include additional, fewer and/or different components, that may be configured differently, than depicted in FIG. 1. For example, though only a single user 100 having a single mobile device 105 is shown in FIG. 2, multiple users 100, each with their own respective mobile device 105, smart card 205, and user device(s) 210, may be included in network environment 200.

Figure 3:
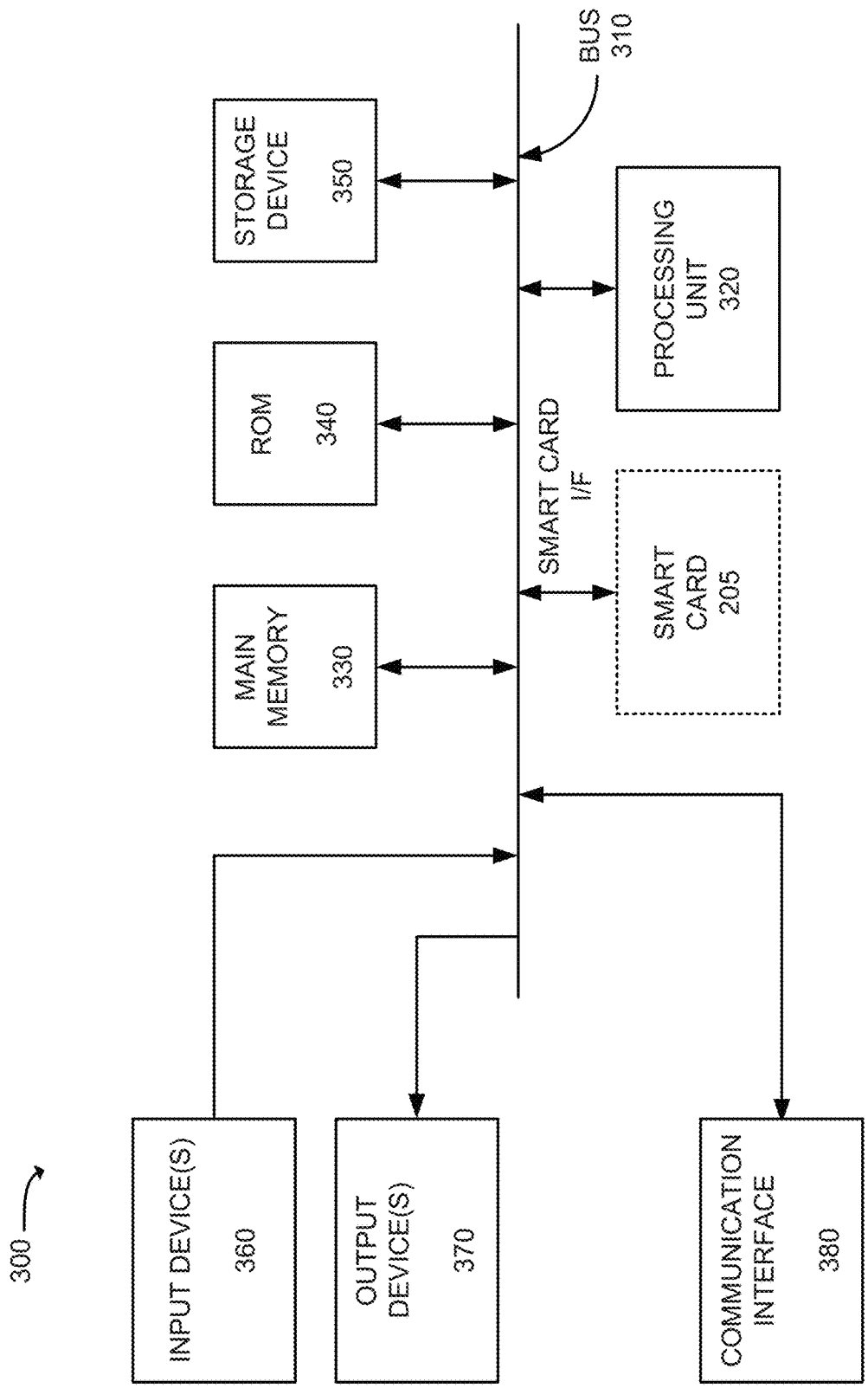
FIG. 3 is a diagram of exemplary components of a device that may correspond to the mobile device, and/or user device(s), of FIG. 2.

FIG. 3 is a diagram of exemplary components of a device 300. Mobile device 105, and user device(s) 210 may each include the same, or similar components, in a same or similar configuration to that depicted in FIG. 3. Device 300 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of device 300. As further shown in FIG. 3, in at least the case of device 300 being mobile device 105, smart card 205 may be inserted into a smart card interface (I/F) of mobile device 105.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device(s) 360 may include one or more mechanisms that permit an operator to input information to device 300, such as, for example, a keypad or a keyboard, voice recognition and/or biometric mechanisms, etc. In the case of mobile device 105, one or more of input device(s) 360 may be used as biometric input devices. For example, if input device(s) 360 includes a touch panel (e.g., as part of a touch screen display), then user 100 can place a pad of a finger upon the touch panel, and the touch panel can scan the finger pad of user 100 to obtain fingerprint biometric data. As another example, if input device(s) 360 includes a camera, then user 100 can aim the camera at one of user 100's eyes, and the camera can scan (i.e., take a picture) an iris or retina of the user 100's eye to obtain eye biometric data. As an additional example, if input device(s) 360 includes a microphone (and associated recording and audio storage circuitry), then user 100 can speak into the microphone, and the recording circuitry can record the word or phrase spoken by the user to obtain voice pattern biometric data.

Output device(s) 370 may include one or more mechanisms that output information to the operator, including a display, a speaker, etc. Communication interface 380 may include any transceiver mechanism that enables device 300 to communicate with other devices and/or systems. For example, communication interface 380 may include mechanisms for communicating with another device or system via a network, such as network 240.

Device 300 may perform certain operations or processes, as may be described in detail below. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. Main memory 330, ROM 340, and storage device 350 may each be referred to herein as a "tangible non-transitory computer-readable medium."

The software instructions may be read into main memory 330 from another computer-readable medium, such as storage device 350, or from another device via communication interface 380. The software instructions contained in main memory 330 may cause processing unit 320 to perform operations or processes that will be described later. Alternatively, hardwired circuitry may be used in place of or in combination with software instructions to implement processes described herein. Thus, exemplary implementations are not limited to any specific combination of hardware circuitry and software.

The configuration of components of device 300 illustrated in FIG. 3 is for illustrative purposes only. It should be understood that other configurations may be implemented. Therefore, device 300 may include additional, fewer and/or different components, arranged in a different configuration, than depicted in FIG. 3.

Figure 4:
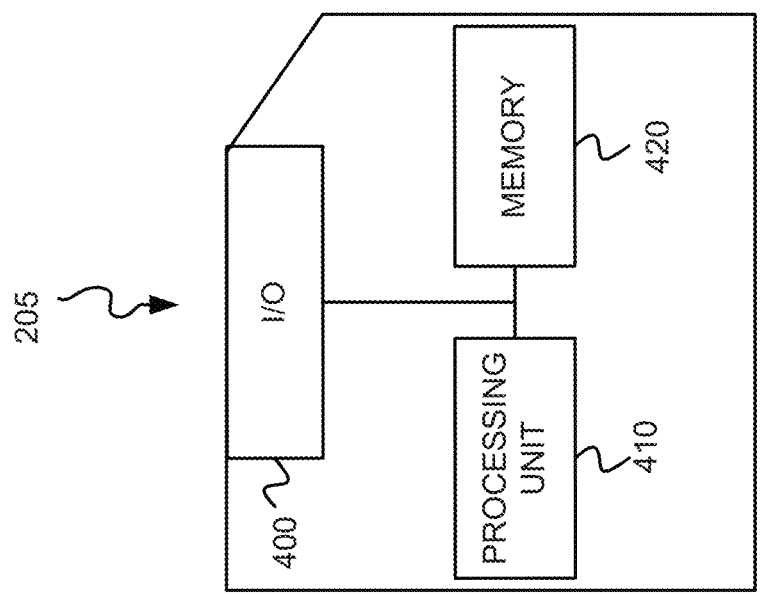
FIG. 4 is a diagram that depicts exemplary components of the smart card associated with the mobile device of FIG. 2.

FIG. 4 is a diagram that depicts exemplary components of smart card 205. Smart card 205 may include input/output circuitry 400, a processing unit 410, and a memory 420. Input/output circuitry 400 may include circuitry for inputting data to smart card 205 from mobile device 105, and output circuitry for outputting data from smart card 205 to mobile device 105. Processing unit 410 may include a processor, microprocessor, or processing logic that may interpret and execute instructions. Memory 420 may include RAM, ROM, and/or Electrically Erasable Programmable Read-Only Memory (EEPROM) that may store data, and may store instructions for execution by processing unit 410. For example, processing unit 410 may execute instructions for calculating a response to an authentication and key agreement (AKA) challenge received from authentication server 220 via certificate authority 175 (described further below).

Smart card 205 may perform certain operations or processes, as described herein. Smart card 205 may perform these operations in response to processing unit 410 executing software instructions contained in a computer-readable medium, such as memory 420. The software instructions contained in memory 420 may cause processing unit 410 to perform operations or processes that will be described later.

The configuration of components of smart card 205 illustrated in FIG. 4 is for illustrative purposes only. It should be understood that other configurations may be implemented. Therefore, smart card 205 may include additional, fewer and/or different components, arranged in a different configuration, than depicted in FIG. 4.

Figure 5A:
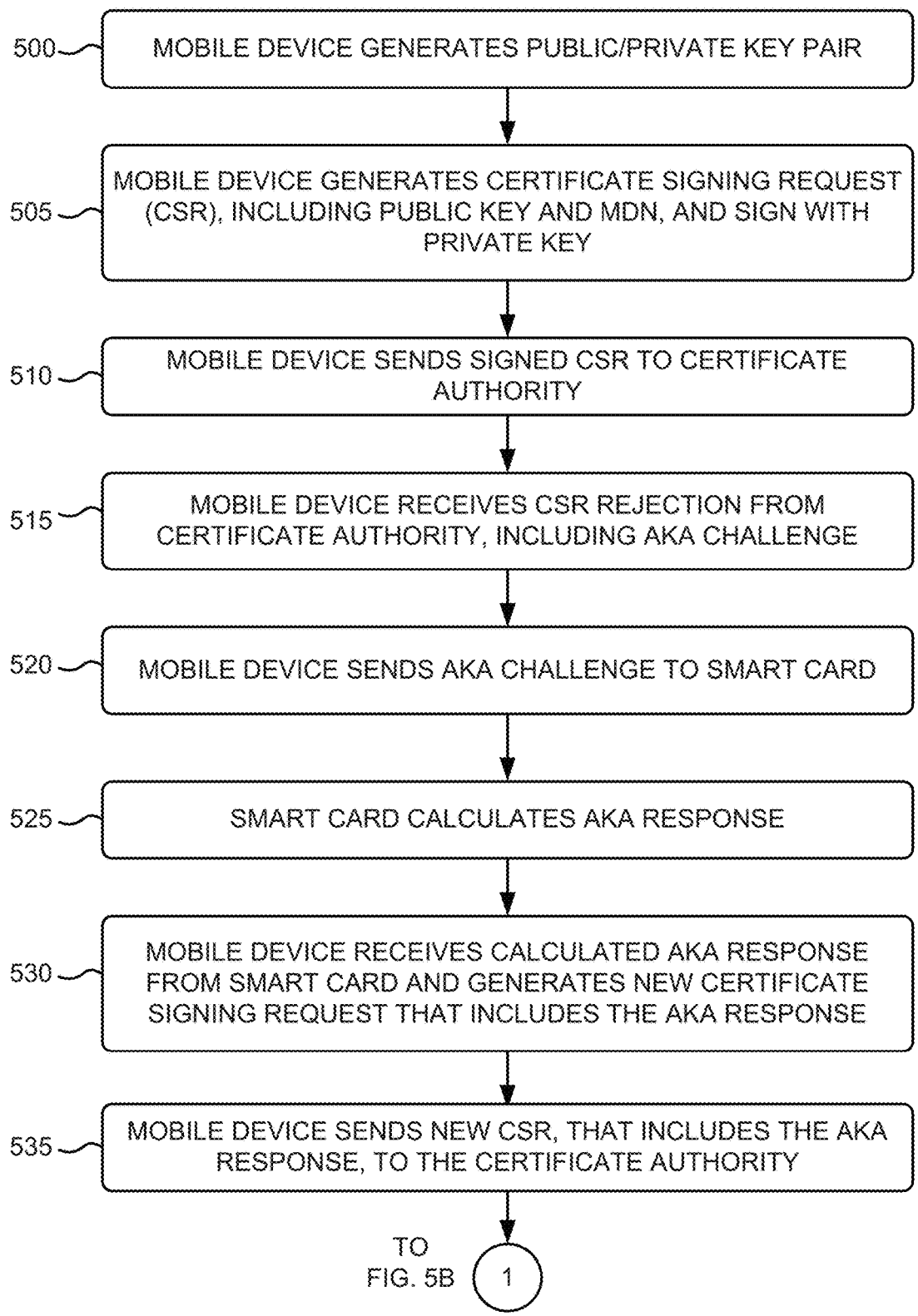
FIGS. 5A and 5B are flow diagrams illustrating an exemplary process for obtaining a digital certificate from a certificate authority, and using biometric data related to a user for password protecting the storage of a digital certificate, and a public/private key pair, in a key store at the mobile device of FIG. 2.
Figure 5B:
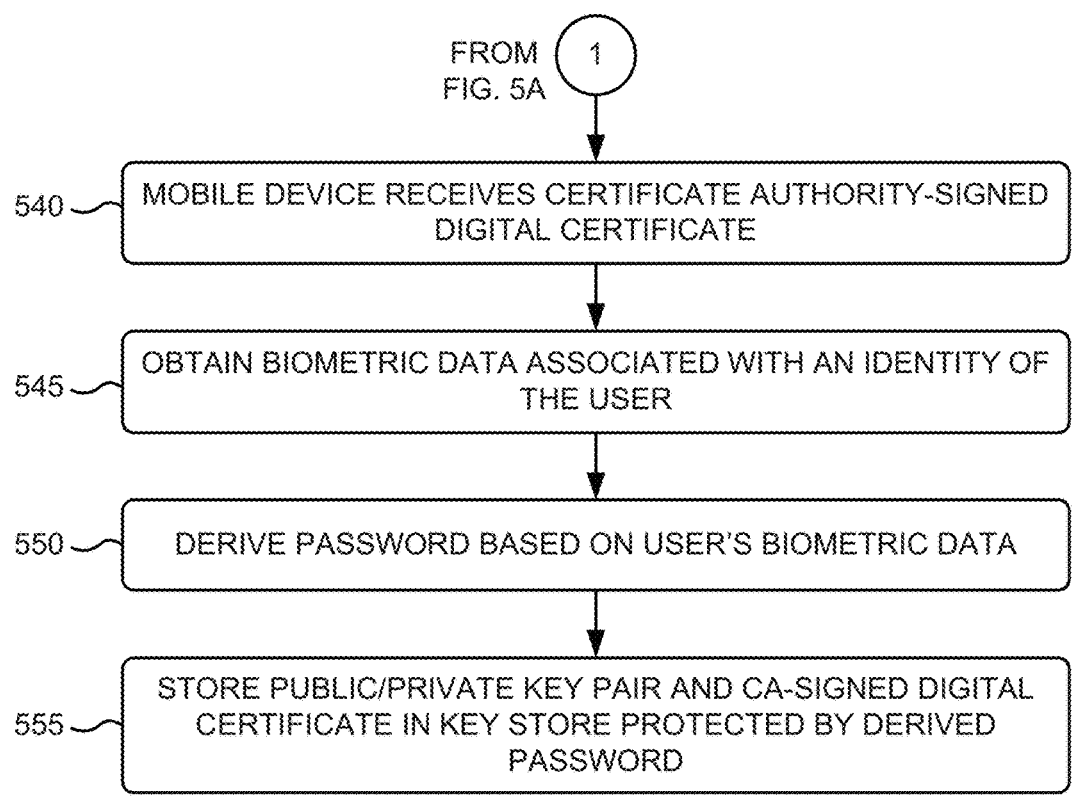

FIGS. 5A and 5B are flow diagrams illustrating an exemplary process for obtaining a digital certificate from a PKI certificate authority, and using biometric data related to user 100 for password protecting the digital certificate, and a public/private key pair, in a key store at mobile device 105. The exemplary process of FIGS. 5A & 5B may be implemented by mobile device 105 in conjunction with smart card 205. The exemplary process of FIGS. 5A and 5B is described with reference to the exemplary messaging diagram of FIG. 6.

The exemplary process may include mobile device 105 generating a public/private key pair (block 500). Mobile device 105 may generate the public key and the private key of the key pair using an asymmetric encryption key generation algorithm. In one implementation, for example, mobile device 105 may use the Public-Key Cryptography Standard (PKCS) #1 to generate the encryption key pair, where PKCS #1 utilizes the Rivest, Shamir & Adleman (RSA) asymmetric key generation algorithm. In other implementations, any type of asymmetric encryption key generation algorithm may be used. For example, as an alternative to PKCS #1, Elliptical Curve Cryptography may be used for generating the public/private key pair.

Figure 6:
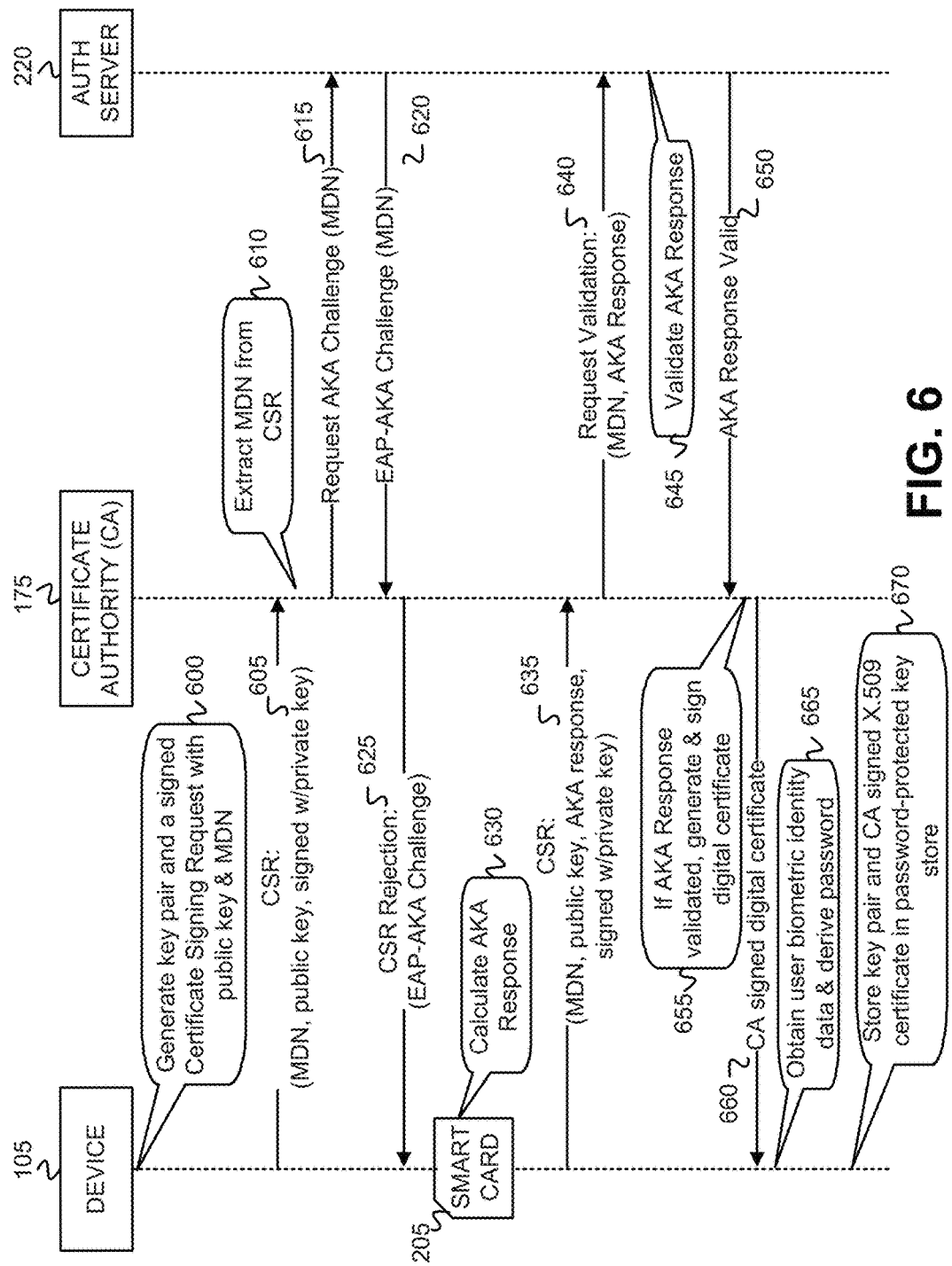
FIG. 6 is a messaging diagram associated with the exemplary process of FIGS. 5A & 5B.

Mobile device 105 generates a first certificate signing request (CSR), including the generated public key and mobile device 105's MDN, and signs the first CSR with the generated private key (block 505). Mobile device 105 may use PKCS #10 as the format standard for generating the first CSR. FIG. 6 depicts mobile device 105 generating 600 the key pair and a signed CSR that further includes the MDN and the public key.

Mobile device 105 sends the signed first CSR to PKI certificate authority 175 (block 510). As shown in FIG. 6, mobile device 105 sends a CSR 605 to certificate authority 175, where CSR 605 is signed with the private key generated in block 500, and further includes the MDN, and the public key generated in block 500. Upon receipt of CSR 605, certificate authority 175 extracts 610 the MDN from CSR 605 and sends a Request AKA Challenge message 615, which includes the MDN, to Authentication Server 220.

Authentication server 220, upon receipt of the CSR, generates an Authentication and Key Agreement (AKA) challenge, requiring a proper response by mobile device 105 in order to authenticate user 100. In one implementation the AKA challenge may include an Extensible Authentication Protocol (EAP)-AKA challenge. FIG. 6 depicts authentication server 220 returning an EAP-AKA challenge message 620, which includes the MDN associated with mobile device 105, to certificate authority 175. In one implementation, message 620 may include a Session Initiation Protocol (SIP) 200 OK message. Certificate Authority 175, in turn, generates a CSR rejection message 625 that includes the AKA challenge received from authentication server 220, and certificate authority 175 sends message 625 to mobile device 105. Mobile device 105 receives the CSR rejection from PKI certificate authority 175, including the AKA challenge (block 515), sends the AKA challenge to smart card 205 (block 520), and smart card 205, upon receipt of the AKA challenge, calculates an AKA response (block 525). FIG. 6 depicts smart card 205, subsequent to receipt of CSR rejection 625, which includes the EAP-AKA challenge originated by authentication server 220, calculating 630 an AKA response. Smart card 205 passes the AKA response back to mobile device 105. Smart card 205 may, for example, calculate the AKA response using an Extensible Authentication Protocol (EAP) mechanism.

Mobile device 105 receives the calculated AKA response from smart card 205, generates a new CSR that includes the AKA response (block 530), and sends the new CSR, including the AKA response, to PKI Certificate Authority 175 (block 535). Mobile device 105 generates the new CSR by including the public key, mobile device 105's MDN, and the AKA response, and by signing the new CSR with the private key. Mobile device 105 may use PKCS #10 as the format standard for generating the new CSR. FIG. 6 shows mobile device 105 sending a new signed CSR 635, which includes the MDN, public key, and AKA response, to certificate authority 175. Certificate authority 175, in turn, forwards a request validation message 640 to authentication server 220, where message 640 includes the MDN and the AKA response received from mobile device 105.

Upon receipt of request validation message 640, authentication server 220, as shown in FIG. 6, validates 645 user 100 based on the calculated AKA response received in message 640. Authentication server 220, upon successful validation of user 100 based on the received AKA response, returns an AKA response valid message 650 to certificate authority 175. Certificate authority 175, if message 650 indicates a successful authentication of user 100, generates 655 and signs a digital certificate, and sends the certificate authority-signed digital certificate 660 to mobile device 105. In one implementation, the digital certificate includes an X.509 certificate. The X.509 certificate includes, among other information, an identification of the algorithm used by the issuer to sign the certificate, the issuer's name, the validity period (e.g., start and end data/time), the name of the identity to which the certificate is issued, and the public key associated with the identity to which the certificate is issued.

Upon receipt of the digital certificate signed by PKI certificate authority 175 at mobile device 105 (block 540), mobile device 105 obtains biometric data associated with an identity of user 100 (block 545). User 100, using one or more biometric input devices of mobile device 105, can obtain different types of biometric information associated with an identity of user 100. If mobile device 105 includes a touch panel (e.g., as part of a touch screen display), then user 100 can use the touch panel to scan a finger pad of user 100 to obtain fingerprint biometric data associated with user 100. If mobile device 105 includes a camera, then user 100 can use the camera to scan (i.e., take a picture of) an iris or retina of an eye of the user to obtain eye biometric data associated with user 100. If mobile device 105 includes a microphone and associated recording circuitry, then user 100 can speak into the microphone to record a word or phrase to obtain voice pattern biometric data associated with user 100. The fingerprint biometric data, the eye biometric data and/or the voice pattern biometric data may serve as biometric data that uniquely identifies user 100.

In block 545, the exemplary process of FIGS. 5A and 5B makes the key assumption that mobile device 105 is in the possession of user 100 when obtaining the biometric identity data. The obtained biometric identity data is used in block 550 below to derive a password, but the biometric identity data is not stored in mobile device 105 beyond deriving the password using the password generating algorithm. Therefore, after the password is derived based on the biometric identity data, the biometric identity data is deleted from memory in mobile device 105.

Mobile device 105 derives a password based on user 100's biometric data (block 550), and stores the public/private key pair and the Certificate Authority-signed digital certificate in a key store protected by the derived password (block 555). FIG. 6 depicts mobile device 105 obtaining 665 biometric identity data and deriving the password based on the biometric identity data. FIG. 6 further shows mobile device 105 storing 670 the public/private key pair and certificate authority-signed digital certificate in a key store (e.g., in memory 330), where the derived password is used to password protect the key pair and digital certificate such that they cannot be retrieved from the key store without the biometric-derived password.

The exemplary process of FIGS. 5A and 5B may be repeated each time user 100 changes the public/private key pair, or each time user 100 attempts to obtain a new digital certificate.

Figure 7:
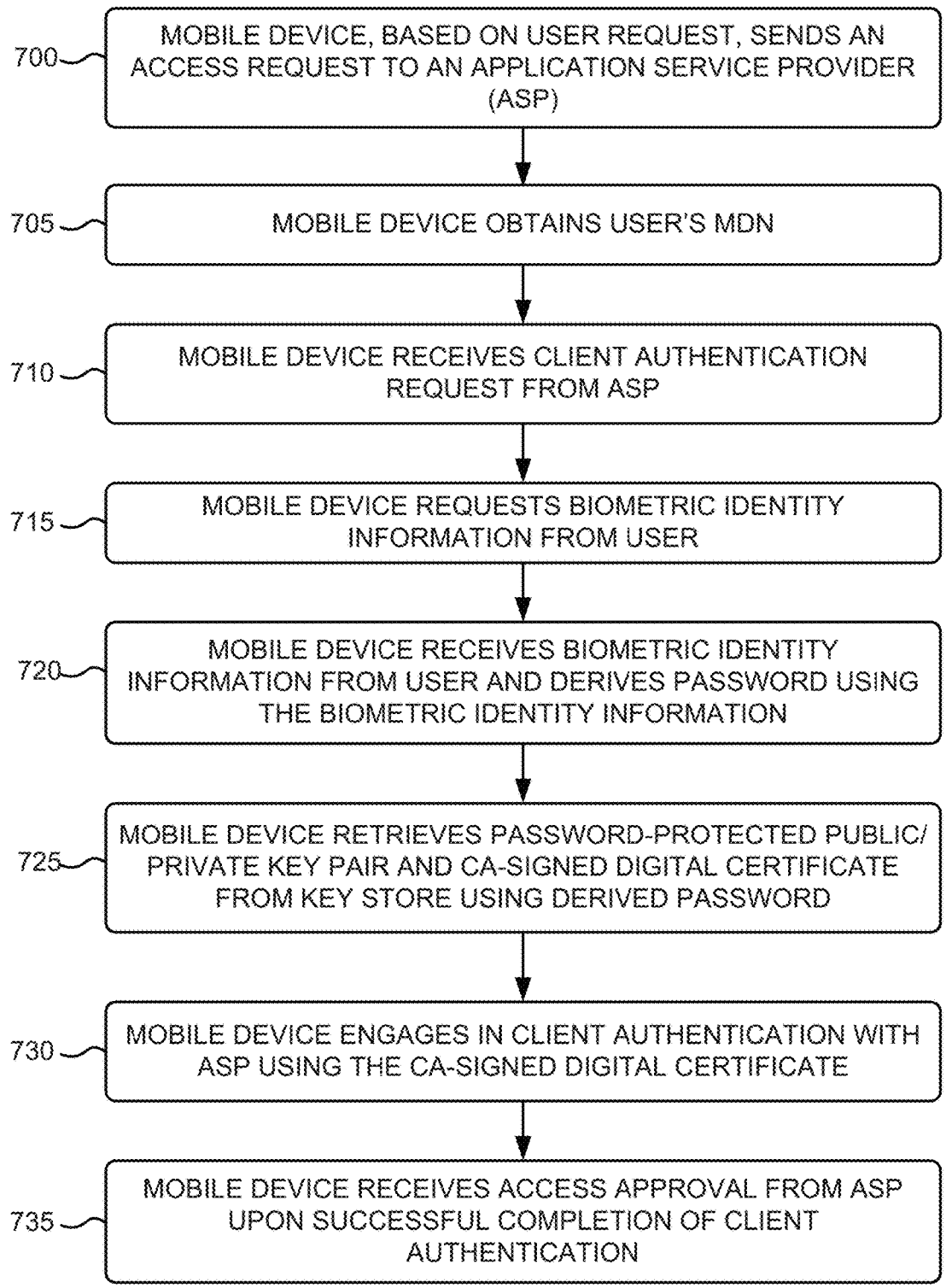
FIG. 7 is a flow diagram illustrating an exemplary process for authenticating a user for access approval by an application service provider.

FIG. 7 is a flow diagram illustrating an exemplary process for authenticating a user for access approval by an application service provider (ASP). The access approval may relate to user 100 setting up an account with the ASP, or the access approval may relate to user 100 logging into user 100's account subsequent to the account being established with ASP. The exemplary process of FIG. 7 may be implemented by mobile device 105 in conjunction with PKI certificate authority 175. The exemplary process of FIG. 7 is described with reference to the exemplary messaging diagram of FIG. 8.

The exemplary process may include mobile device 105, based on a request by user 100, sending an access request to an Application Service Provider (ASP) 165 (block 700). User 100 may wish to set up an account with ASP 165, or may wish to log into an already established account with ASP 165. Mobile device 105 obtains user 100's MDN (block 705). Mobile device 105 may retrieve the MDN for mobile device 105 from, for example, memory 330 of mobile device, or from smart card 205. Mobile device 105 receives, responsive to the access request, a client authentication request from ASP 165 (block 710). The access request may be associated with an attempt to log into user 100's account with ASP 165, or with an attempt by user 100 to establish an account with ASP 165. FIG. 8 depicts mobile device 105 sending an access request message 800 to ASP 165, and obtaining 805 the MDN of mobile device 105. FIG. 8 further shows ASP 165, responsive to receipt of access request message 800, sending a client authentication request 810 to mobile device 105.

Mobile device 105 requests biometric identity information from user 100 (block 715). Upon receipt of client authentication request 810, mobile device 105 may request (e.g., via a display pop-up message) that user 100 provide the biometric input previously used (in block 545 of the process of FIGS. 5A and 5B) to password protect the public/private key pair and the previously received digital certificate. User 100 may use a same biometric input device(s), as used in block 545 of the process of FIGS. 5A and 5B, to obtain the biometric identity data.

Mobile device 105 receives biometric identity information from user 100, and derives a password using the biometric identity information (block 720). Mobile device 105 may one or more of various different algorithms for deriving the password based on the biometric identity information obtained in block 715. In one implementation, the password may be derived by performing a hash algorithm upon the biometric identity data. Mobile device 105 retrieves the password-protected public/private key pair and certificate authority-signed digital certificate from the key store using the derived password (block 725). FIG. 8 depicts mobile device 105 obtaining 815 the user biometric identity data from user 100, and deriving the password based on the biometric identity data.

Mobile device 105 engages in client authentication with ASP 165 using the certificate authority-signed digital certificate (block 730). The client authentication process may include mobile device 105 sending user 100's MDN, and the certificate authority-signed digital certificate retrieved from the key store in block 725. FIG. 8 depicts client authentication 825 occurring between mobile device 105, and ASP 165, where the client authentication 825 includes the transmission of user 100's MDN and the retrieved digital certificate from mobile device 105 to ASP 165.

Upon receipt of the digital certificate from mobile device 105, ASP 165 attempts to authenticate the digital certificate by sending a certificate authentication message 830 to certificate authority 175, where message 830 includes the certificate authority-signed digital certificate received from mobile device 105. Certificate authority 175 authenticates the digital certificate and, if the digital certificate is determined to be valid, certificate authority 175 sends a valid certificate response 835 to ASP 165. Mobile device 105 receives access approval from ASP 165 upon successful completion of the client authentication (block 735). Referring to FIG. 8, upon receipt of response 835, ASP 165 returns an access approved message 840 to mobile device 105. Based on receipt of the access approved message 840, user 100 at mobile device 105 may continue with establishing an account with ASP 165, or logging into an existing account at ASP 165. ASP 165 may use the MDN to login, or create an account, for user 100.

The exemplary process of FIG. 7 may be repeated each time user 100 attempts to establish an account with an ASP 165, or attempts to log into an existing account with an ASP 165. The exemplary process of FIG. 7 is described as being executed by mobile device 105 by itself. In some implementations, a user device 210 associated with a user 100 may perform blocks 700 and 735 of FIG. 7, with blocks 705-730 being executed by mobile device 105 also associated with user 100. In this implementation, user 100 uses user device 210 to access ASP(s) 165, but ASP 165 in conjunction with certificate authority 175 engages in the authentication process with mobile device 105 (and not user device 210) where the user's key pair and digital certificate is stored and password protected using a biometric-based password.

The exemplary processes of FIGS. 5A and 5B, and FIG. 7, described above, enable a high degree of security for providing access to ASP(s) 165. For example, if Charlie steals Bob's key store from Bob's mobile device, the key store will be useless—the biometric based password will be very hard to crack and Charlie's user identity will not be valid. Additionally, if Charlie steals Bob's digital certificate, the client authentication process (e.g., block 730 of FIG. 7) will fail because Charlie's does not have the private key used to sign the digital certificate. Also, if Charlie steals Bob's mobile device 105, Charlie still cannot login to Bob's account because Charlie will not be able to provide the biometric user identity information necessary to access Bob's key store 150. Furthermore, Charlie cannot use phishing or social engineering to steal Bob's password because there is no conventional password to be stolen.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5A, 5B and 7, the order of the blocks may be modified in other embodiments. Further, non-dependent blocks may be performed in parallel. The Mobile Directory Number (MDN) is described herein as being used for identifying mobile device 105 (e.g., in block 505 of FIG. 5A, and block 705 of FIG. 7). In other implementations, however, any other type of identifier chosen by the Mobile Network Operator (MNO) may be used for identifying mobile device 105. For example, in a Voice over Internet Protocol (VoIP) application, there is no MDN but, instead, a SIP Uniform Resource Identifier (URI) is used. Furthermore, the exemplary processes are described herein as requesting, storing, and using a digital certificate (e.g., an X.509 certificate) for authentication. However, other types of identity authentication mechanisms may be used instead of digital certificates. For example, Javascript Object Notation (JSON) tokens, signed with asymmetric keys, may be used instead of the digital certificates described above.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    obtaining an encryption key pair, including a public key and a private key, and a mobile directory number (MDN) associated with a device;
    generating and signing, using the private key, a first certificate signing request (CSR), wherein the first CSR includes the MDN;
    sending the first CSR to a Public Key Infrastructure (PKI) Certificate Authority;
    receiving, responsive to the first CSR, a CSR rejection from the PKI Certificate Authority, wherein the CSR rejection includes an authentication and key agreement (AKA) challenge;
    calculating, based on receipt of the AKA challenge, an AKA response;
    sending, to the PKI Certificate Authority, a second CSR that includes the AKA response;
    receiving, at the device and in response to the second CSR, a digital certificate signed by the PKI Certificate Authority;
    obtaining, at the device, biometric data related to an identity of a user of the device;
    deriving a password based on the biometric data; and
    storing, and password protecting using the derived password, the public key, the private key, and the digital certificate in a secure key store within the device.

2. The method of claim 1, wherein obtaining the biometric data related to the identity of the user comprises:
    scanning a finger pad of the user to obtain fingerprint biometric data;
    scanning an iris or retina of an eye of the user to obtain eye biometric data; or
    recording a word or phrase spoken by the user to obtain voice pattern biometric data.

3. The method of claim 2, wherein deriving the password based on the biometric data comprises:
    applying an algorithm to the fingerprint biometric data, the eye biometric data, or the voice pattern biometric data to generate the password.

4. The method of claim 1, wherein obtaining the encryption key pair comprises:
    using Public-Key Cryptography Standard (PKCS) #1 to generate the encryption key pair.

5. The method of claim 1, wherein the AKA challenge comprises an Extensible Authentication Protocol (EAP)-AKA challenge.

6. The method of claim 1, wherein obtaining the encryption key pair comprises:
    generating, using an asymmetric encryption key generation algorithm, the encryption key pair.

7. The method of claim 6, wherein the asymmetric encryption key generation algorithm comprises the Rivest, Shamir & Adleman (RSA) key generation algorithm.

8. A device, comprising:
    a communication interface configured to connect to a network via a link;
    a memory;
    a biometric input device; and
    a processing unit, or logic, configured to:
        obtain an encryption key pair, including a public key and a private key;
        generate and sign, using the private key, a first certificate signing request (CSR), wherein the first CSR includes a Mobile Directory Number (MDN) associated with the device;
        send the first CSR to a Public Key Infrastructure (PKI) Certificate Authority;
        receive, responsive to the first CSR, a CSR rejection from the PKI Certificate Authority, wherein the CSR rejection includes an authentication and key agreement (AKA) challenge;
        send, to the PKI Certificate Authority via the communication interface, a second CSR that includes an AKA response;
        receive, from the PKI Certificate Authority via the communication interface and in response to the second CSR, a digital certificate signed by the PKI Certificate Authority,
        obtain, via the biometric input device, biometric data related to an identity of a user of the device,
        derive a password using the biometric data, and
        store, and password protect using the derived password, the public key, the private key, and the digital certificate in a secure key store within the memory.

9. The device of claim 8, wherein the biometric input device comprises:
    a touch panel configured to scan a finger pad of the user to obtain fingerprint biometric data,
    a camera configured to scan an iris or retina of an eye of the user to obtain eye biometric data, or
    a microphone and associated recording circuitry configured to record a word or phrase spoken by the user to obtain voice pattern biometric data.

10. The device of claim 8, wherein the processing unit, or logic, when obtaining the encryption key pair, is configured to:
    generate, using an asymmetric encryption key generation algorithm, the encryption key pair, including the public key and the private key.

11. The device of claim 10, wherein the asymmetric encryption key generation algorithm comprises the Rivest, Shamir & Adleman (RSA) key generation algorithm.

12. The device of claim 8, further comprising:
    a microprocessor smart card that couples with the processing unit, or the logic, and is configured to, in cooperation with the processing unit, or the logic, send the first CSR to the PKI Certificate Authority.

13. The device of claim 12, wherein the microprocessor smart card comprises one of a Universal Integrated Circuit Card (UICC), a removable user identity card (R-UIM), or a subscriber identity module (SIM).

14. The device of claim 8, further comprising:
a smart card that couples with the processing unit, or the logic, and is configured to:
calculate, based on receipt of the AKA challenge, the AKA response, and
pass the AKA response to the processing unit, or the logic.

15. The device of claim 8, wherein the device comprises one of a cellular radiotelephone; a smart phone; a personal digital assistant (PDA); a desktop, laptop, palmtop or tablet computer; a gaming device; a media player device; or a digital camera.

16. The device of claim 8, wherein the AKA challenge comprises an Extensible Authentication Protocol (EAP)-AKA challenge.

17. A device, comprising:
a memory;
a biometric input device, wherein the biometric input device comprises one or more of:
a touch panel configured to scan a finger pad of a user of the device to obtain fingerprint biometric data,
a camera configured to scan an iris or retina of an eye of the user to obtain eye biometric data, or
a microphone and associated recording circuitry configured to record a word or phrase spoken by the user of the device to obtain voice pattern biometric data;
a communication interface configured to connect to a network via a link; and
a processing unit, or logic, configured to:
obtain an encryption key pair, including a public key and a private key;
generate and sign, using the private key, a first certificate signing request (CSR), wherein the first CSR includes a Mobile Directory Number (MDN) associated with the device;
send, via the communication interface, the first CSR to a Public Key Infrastructure (PKI) certificate authority;
receive, responsive to the first CSR via the communication interface, a CSR rejection from the PKI certificate authority, wherein the CSR rejection includes an authentication and key agreement (AKA) challenge;
send, to the PKI certificate authority via the communication interface, a second CSR that includes an AKA response;
receive, via the communication interface from the PKI certificate authority responsive to the AKA response, a digital certificate signed by a Public Key Infrastructure (PKI) Certificate Authority,
obtain, via the biometric input device, the fingerprint biometric data, the eye biometric data, or the voice pattern biometric data,
derive a password using the fingerprint, eye or voice pattern biometric data, and
store, and password protect using the derived password, the public key, the private key, and the digital certificate in a secure key store within the memory.

18. The device of claim 17, further comprising:
a microprocessor smart card that couples with the processing unit, or the logic and is configured to:
calculate, based on receipt of the AKA challenge, the AKA response, and
pass the AKA response to the processing unit, or the logic.

19. The device of claim 18, wherein the microprocessor smart card comprises one of a Universal Integrated Circuit Card (UICC), a removable user identity card (R-UIM), or a subscriber identity module (SIM).

20. The device of claim 17, wherein the AKA challenge comprises an Extensible Authentication Protocol (EAP)-AKA challenge.

* * * * *